United States Patent Office 3,018,286
Patented Jan. 23, 1962

3,018,286
12-AZA-DESERPIDINE AND INTERMEDIATES AND PROCESS THEREFOR
Leon Velluz, Paris, Georges Muller, Nogent-sur-Marne, and Andre Allais, Paris, France, assignors to Les Laboratoires Francais de Chimiotherapie, Paris, France, a corporation of France
No Drawing. Filed Jan. 26, 1960, Ser. No. 4,621
Claims priority, application France Feb. 4, 1959
14 Claims. (Cl. 260—240)

This invention relates to a novel pentacyclic alkaloid, and more particularly to levorotatory in chloroform 18β-(3',4',5'-trimethoxy-benzoyloxy)-17α-methoxy-16β-carbomethoxy-12-aza-3β,20α-yohimbane, a process for its preparation and intermediates in its preparation.

It is known that certain alkaloids of the 3β,20α-yohimbane series of the formula

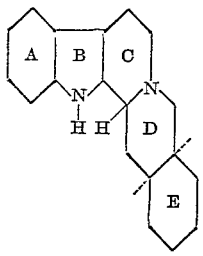

which have various substituents attached to the E ring and possibly to the A and C rings, possess remarkable physiological properties. They are very effective tranquilizers and hypnotics. The A ring of all of these products consist of an unsubstituted or substituted benzene radical, as is the case in reserpine and deserpidine.

An object of the present invention is the obtention of 3β,20α-yohimbane products having a pyridine ring rather than a benzene ring in the A ring of the yohimbane molecule.

A further object of the invention is the preparation of 18β-(3',4',5'-trimethoxy-benzoyloxy)-17α-methoxy-16β-carbomethoxy-12-aza-3β,20α-yohimbane and especially the levorotatory isomer (12-aza-deserpidine).

Another object of the invention is the development of a process for the preparation of 18β-(3',4',5'-trimethoxy-benzoyloxy)-17α-methoxy-16β-carbomethoxy-12-aza-3β,20α-yohimbane and especially the levorotatory isomer.

A still further object of the invention is the preparation of the novel intermediates:

(a) 18β-acetoxy-17α-methoxy-16β-carbomethoxy-2-3,3-4-diseco-12-azaΔ⁴⁽²¹⁾-20α-yohimbene-3-oic acid
(b) 18β-acetoxy-17α-methoxy-16β-carbomethoxy-2-3,3-4-diseco-12-aza-20α-yohimbane-3-oic acid
(c) 18β-acetoxy-17α-methoxy-16β-carbomethoxy-3-oxo-2-3-seco-12-aza-20α-yohimbane
(d) 18β-acetoxy-17α-methoxy-16β-carbomethoxy-12-aza-Δ³⁽¹⁴⁾-20α-yohimbene
(e) 18β-acetoxy-17α-methoxy-16β-carbomethoxy-12-aza-3α,20α-yohimbane
(f) 18β-acetoxy-17α-methoxy-16β-carbomethoxy-12-aza-3β,20α-yohimbane
(g) 18β-hydroxy-17α-methoxy-16β-carbomethoxy-12-aza-3β,20α-yohimbane These and other objects of the invention will become more apparent as the description proceeds.

We have now quite unexpectedly discovered that a new synthetic alkaloid having the skeleton structure of 3β,20α-yohimbane, but in which the A benzene ring is replaced by a pyridine ring, also exhibits activities which are typical of the reserpine compounds.

This new compound, levorotatory in chloroform 18β-(3',4',5'-trimethoxy-benzoyloxy)-17α-methoxy-16β-carbomethoxy-12-aza-3β,20α-yohimbane of the formula

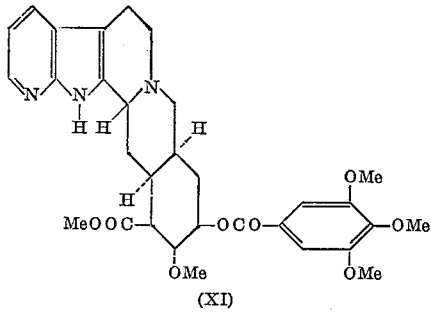

M.P.=290° C. [α]$_D^{20}$=—157° (chloroform), as well as the intermediate compounds of its preparation are the subject of the present invention.

According to the process of the invention, the new alkaloid of the Formula XI is prepared by the succession of reactions shown in the schematic flow sheet of Table I.

TABLE I

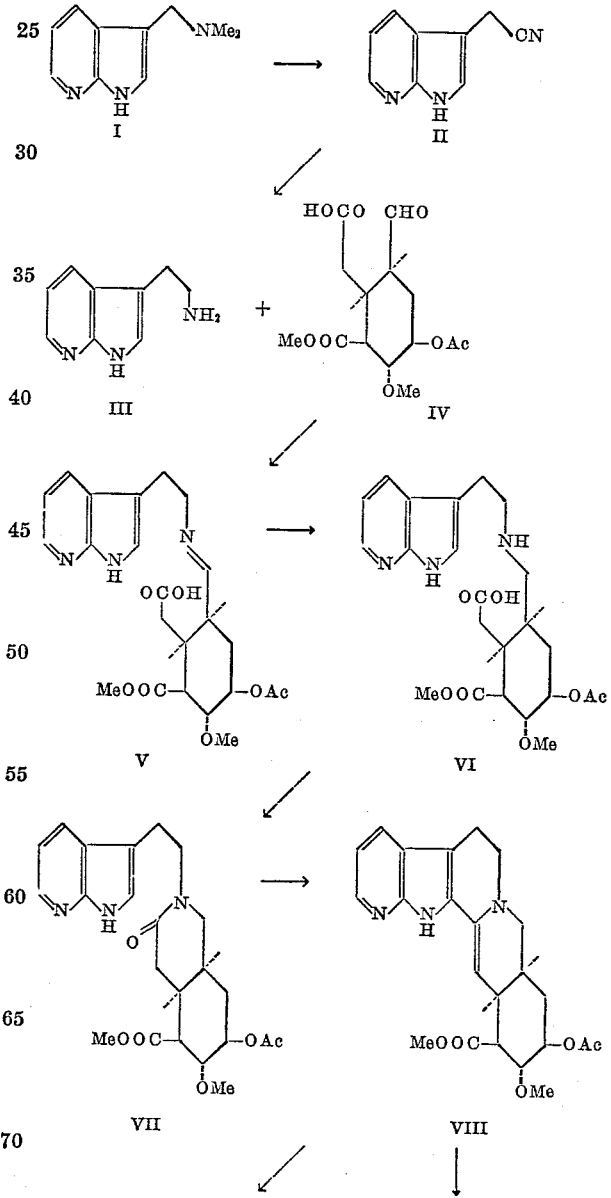

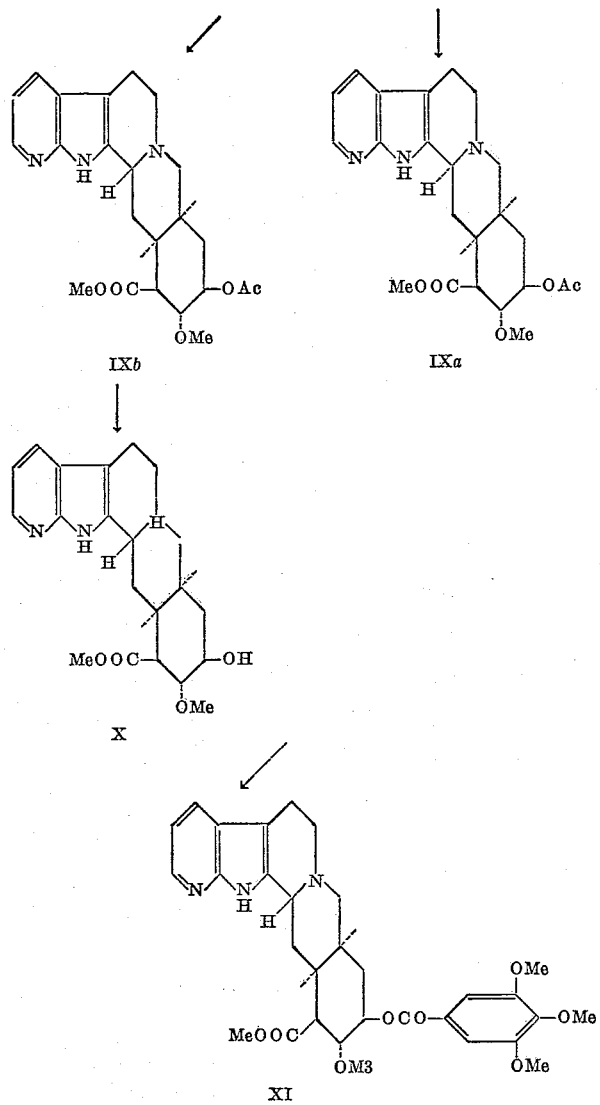

These reactions consist of subjecting 7-azagramine I to a quaternization reaction with an alkyl ester such as a methyl or ethyl ester with an inorganic or organic acid, preferably with dimethyl sulfate. The quaternary ammonium compound such as the sulfomethylate of gramine thus formed is reacted with an alkali metal cyanide such as potassium cyanide at elevated temperatures to form 7-aza-indolyl-3-acetonitrile (II). This compound is catalytically hydrogenated into 7-aza-tryptamine (III). The catalytic hydrogenation is carried out under the customary conditions. Platinum or palladium catalysts can be used although a Raney nickel catalyst is preferred. The 7-aza-tryptamine (III) is condensed with dextrorotatory (pyridine) 1β - carboxymethyl-2β-carbomethoxy-3α-methoxy-4β-acetoxy-6β-formyl-cyclohexane (IV) preferably in the presence of a tertiary amine such as triethylamine and in an aqueous organic solvent such as aqueous dimethylformamide at low temperatures. If the racemic compound or the corresponding stereoisomer are desired, the racemic or levorotatory enantiomorphs can be utilized. The Schiff's base condensation product, 18β-acetoxy-17α-methoxy - 16β - carbomethoxy-2-3,3-4-diseco - 12 - aza-Δ⁴⁽²¹⁾-20α-yohimbene-3-oic acid (V) is reduced to give 18β - acetoxy - 17α - methoxy-16β-carbomethoxy-2-3,3-4-diseco-12-aza-20α-yohimbane-3-oic acid (VI) by customary means such as with an alkali metal borohydride in an inert solvent at low temperatures. The D ring is then closed by heating an acidified solution of the resulting compound (pH of 5-6) above about 75° C. The C ring is closed by refluxing the resulting compound with phosphorus oxychloride. The excess phosphorus oxychloride is removed and the residue is neutralized with ammonia so as to obtain 18β-acetoxy-17α-methoxy-16β-carbomethoxy-12-aza-Δ³⁽¹⁴⁾-20α-yohimbene (VIII). This compound is reduced stereospecifically by the action of zinc into 18β-acetoxy-17α-methoxy-16β-carbomethoxy-12-aza-3β,20α-yohimbane (IXb), which can be separated from its 3α-isomer (IXa) by making use of the difference of their solubilities. The 3β-isomer (IXb) is partially saponified in a reducing medium such as an alkali metal borohydride in an inert organic solvent, to give 18β-hydroxy - 17α - methoxy - 16β - carbomethoxy-12-aza-3β,20α-yohimbane (X). The latter compound is esterified with a functional derivative of 3,4,5-trimethoxy-benzoic acid such as the acid chloride or acid anhydride, in the presence of an amine so as to obtain the desired levorotatory 18β-(3',4',5'-trimethoxy - benzoyloxy)-17α-methoxy-16β - carbomethoxy - 12 - aza - 3β,20α-yohimbane. Compound X can be esterified under the same conditions with functional derivatives of other acids. Such other acids include the alkanoic acids, methoxy substituted benzoic and cinnamic acids, succinic acid, hexahydrobenzoic acid, etc.

Within the scope of this general definition of the process, the different stages which make up the invention may advantageously be carried out in the following manner:

(a) The quaternization of the gramine I is effected with dimethyl sulfate in an anhydrous inert organic solvent such as tetrahydrofuran at temperatures below room temperature and preferably at about 0° C.

(b) The hydrogenation catalyst for the hydrogenation of the nitrile II is Raney nickel.

(c) The condensation of 7-aza-tryptamine (III) with the monocyclic aldehyde IV is effected in aqueous dimethylformamide in the presence of triethylamine at temperatures between about +10° C. and —10° C.

(d) The Schiff's base V is reduced by means of an alkali metal borohydride in an aqueous organic solvent at a temperature of between about 0° C. and about —10° C.

(e) The 18β - acetoxy-17α-methoxy-16β-carbomethoxy-12-aza-Δ³⁽¹⁴⁾-20α-yohimbene (VIII) is reduced by the action of zinc in a perchloric acid medium in the presence of an aqueous organic solvent at reflux temperatures.

(f) The 18β - acetoxy-17α-methoxy-16β-carbomethoxy-12-aza-3β,20α-yohimbane (IXb) is selectively saponified with an alkali metal borohydride by refluxing in an inert organic solvent.

(g) The esterification of 18β - hydroxy - 17α-methoxy-16β-carbomethoxy-12-aza-3β,20α-yohimbane (X) is effected with the anhydride of 3,4,5-trimethoxy-benzoic acid in the presence of pyridine and of triethylamine or with 3,4,5-trimethoxy-benzoyl chloride in pyridine solution.

The starting material, 7-aza-gramine (I), is prepared by the method described by M. M. Robison, J. Am. Chem. Soc., 77, 459 (1955), and the dextrorotatory (pyridine) 1β - carboxymethyl - 2β - carbomethoxy - 3α-methoxy-4β-acetoxy-6β-formylcyclohexane (IV) is obtained by the method described in copending commonly assigned application Serial No. 727,780, filed April 11, 1958, now U.S. Patent No. 2,971,978.

The following example of performing the process of the invention is illustrative only and is to be construed as in no way limiting.

The temperatures are indicated in °C. The melting points are instantaneous melting points determined on a Maquenne block.

EXAMPLE

*Preparation of levorotatory in chloroform 18β-(3',4',5'-trimethoxy - benzoyloxy) - 17α - methoxy - 16β - carbomethoxy-12-aza-3β,20α-yohimbane (XI)*

STAGE A.—7-AZA-INDOLYL-3-ACETONITRILE (II)

75 cc. of dimethyl sulfate are admixed with 1400 cc.

of anahydrous tetrahydrofuran. The mixture is cooled to 0° C. and 59.9 gm. of aza-gramine (I), prepared according to M. M. Robison et al., J. Am. Chem. Soc., 77, 459 (1955), are added very slowly to the mixture. After three hours of agitation at 0° C. the quaternary ammonium methosulfate salt of aza-gramine formed thereby is filtered off, washed by trituration with tetrahydrofuran and dried over phosphoric anhydride. 103 gm. of the white, very hygroscopic product, the quaternary ammonium methosulfate salt of aza-gramine, are recovered. This compound is dissolved in 300 cc. of water, the resulting solution is added to a solution of 35.9 gm. of potassium cyanide in 600 cc. of water and the mixture is heated for 3 hours at 70° C. 7-aza-indolyl-3-acetonitrile (II) crystallizes out during the heating step. The reaction mixture is cooled to 0° C. and filtered, and the filter cake is washed by trituration with water. After vacuum filtration and drying in vacuo, 41.1 gm. (which is about 75% of theory) of a yellow powder are obtained. Recrystallization from 15 volumes of benzene yields white prismatic crystals having a melting point of 144° C. The compound, 7-aza-indolyl-3-acetonitrile (II), which is described by Robison et al., J. Am. Chem. Soc., 78, 1247 (1956), as being white crystals melting at 141°–142° C., is soluble in alcohol, acetone, benzene and chloroform, very slightly soluble in ether and insoluble in water.

*Analysis.*—$C_9H_7N_3$; molecular weight=157.17. Calculated: C, 68.77%; H, 4.49%; N, 26.74%. Found: C, 68.7%; H, 4.4%; N, 26.8%.

STAGE B.—7-AZA-TRYPTAMINE (III)

15 gm. of 7-aza-indolyl-3-acetonitrile (II), prepared according to stage A, are introduced into 500 cc. of methanol saturated with ammonia and 6 gm. of Raney nickel, prepared from a nickel-aluminum alloy in equal parts, are added to the mixture. The mixture is hydrogenated for 2 hours while agitating and filtered. 22.5 gm. of the catalyst are again added to the methanolic solution and hydrogenation is continued for another 18 hours, during which period 90% of the theoretical amount of hydrogen is consumed. Thereafter, the reaction mixture is evaporated to dryness in vacuo and the evaporation residue is taken up in 50 cc. of methylene chloride. The solution is filtered and evaporated to dryness to recover 13 gm. of a light brown oil consisting of 7-aza-tryptamine (III). By taking up this product in 50 cc. of methylene chloride, adding 3.95 gm. of acetic acid in solution in 40 cc. of methylene chloride, vacuum filtering and drying, 12.9 gm. (which is 61% of theory) of the crystallized acetate of 7-aza-tryptamine (III) are obtained. The product III is soluble in alcohol, insoluble in acetone, benzene and chloroform. For analysis, the raw acetate is recrystallized from 10 volumes of isopropanol whereupon it has a melting point of 155 to 160° C. (with decomposition).

*Analysis.*—Calculated as the acetate $C_{11}H_{15}O_2N_3$; molecular weight=221.25. Calculated: C, 59.71%; H, 6.83%; N, 18.99%. Found: C, 59.7%; H, 7.0%; N, 18.9%.

STAGE C.—18β-ACETOXY-17α-METHOXY-16β-CARBOMETHOXY-2 3, 3-4-DISECO-12-AZA-Δ⁴⁽²¹⁾-20α-YOHIMBENE-3-OIC ACID (V)

20 gm. of dextrorotatory (in pyridine) 1β-carboxymethyl-2β-carbomethoxy - 3α - methoxy-4β-acetoxy-6β-formylcyclohexane (IV), obtained in accordance with the method described in copending, commonly asssigned application Serial No. 727,780, filed April 11, 1958, now U.S. Patent No. 2,971,978, are introduced into a mixture of 40 cc. of water and 10 cc. of dimethyl formamide. The resulting suspension is cooled to −10° C., 24 gm. of triethylamine are added and then a solution of 10 gm. of the acetate of 7-aza-tryptamine (III) in 10 cc. of dimethylformamide and 10 cc. of water are added. The reaction mixture is agitated for 15 minutes at −5° C.; a solution of 18β-acetoxy-17α-methoxy-16β-carbomethoxy-2-3,3-4-diseco-12-aza-Δ⁴⁽²¹⁾-20α-yohimbene-3-oic acid (V) is obtained which is used as such in the next stage of the synthesis.

STAGE D.—18β-ACETOXY-17α-METHOXY-16β-CARBOMETHOXY-2-3 3-4-DISECO-12-AZA-20α-YOHIMBANE-3-OIC ACID (VI)

5 gm. of potassium borohydride are added at −10° C. to the solution of compound V obtained in the preceding stage and the resulting reaction mixture is agitated for 10 minutes while maintaining the temperature between −5 and −10° C. After adding 20 cc. of water, cooling is discontinued. The solution of 18β-acetoxy-17α-methoxy - 16β - carbomethoxy - 2 - 3,3 - 4 - diseco - 12-aza-20α-yohimbane-3-oic acid (VI) thus obtained is used directly in the next stage of the synthesis.

STAGE E.—18β-ACETOXY-17α-METHOXY-16β-CARBOMETHOXY-3-OXO-2-3-SECO-12-AZA-20α-YOHIMBANE (VII)

The solution of compound VI, obtained in the preceding stage of the synthesis, is slowly acidified to a pH of 5 to 6 by adding acetic acid, and it is then heated at 90° C. for 20 minutes. After cooling and adding concentrated ammonia in excess, the reaction mixture is extracted with methylene chloride. The extract solutions are washed with water, dried and distilled to dryness in vacuo. The residue consisted of 20 gm. of the lactam, 18β - acetoxy - 17α - methoxy - 16β - carbomethoxy - 3-oxo-2-3-seco-12-aza-20α-yohimbane (VII), which is obtained in the form of a colorless resin. This product is used without further purification in the next stage of the synthesis.

STAGE F.—18β-ACETOXY-17α-METHOXY-16β-CARBOMETHOXY-12-AZA-Δ³⁽¹⁴⁾-20α-YOHIMBENE (VIII)

20 gm. of the lactam VII, obtained in the preceding stage of the synthesis, are dissolved in 100 cc. of phosphorus oxychloride and the solution is refluxed for 1½ hours. The solution is then distilled to dryness in vacuo and the residue is taken up in 100 cc. of acetone. Ammonia is then added in excess while cooling and the mixture is poured into water. The resulting aqueous mixture is extracted with methylene chloride. The extract solutions are dried and distilled in vacuo. The residue is taken up in 40 cc. of methanol. The methanolic solution is iced, vacuum filtered, and the filter cake is washed with methanol and dried at 80° C. 7.5 gm. (which is 40% of theory) of 18β-acetoxy-17α-methoxy-16β-carbomethoxy-12-aza-Δ³⁽¹⁴⁾-20α-yohimbene (VIII) having a melting point of 270 to 275° C. (with decomposition) are recovered. This novel product VII is obtained in the form of yellow prisms which are soluble in acetone and chloroform, very slightly soluble in ether and methyl or ethyl alcohol and insoluble in water. For analysis, the raw product is recrystallized from acetone whereupon it has a melting point from 270 to 275° C.

*Analysis.*—$C_{23}H_{27}O_5N_3$; molecular weight=425.47. Calculated: C, 64.92%; H, 6.40%; O, 18.80%; N, 9.88%. Found: C, 65.1%; H, 6.4%; O, 19.2%; N, 9.6%.

The infra-red spectrum confirms the given structure. This compound is new.

STAGE G.—18β-ACETOXY-17α-METHOXY-16β-CARBOMETHOXY-12-AZA-3α,20α-YOHIMBANE (IXa)

300 mgm. of compound VIII are dissolved in 9 cc. of methanol and to the solution 1.8 cc. of 2 N hydrochloric acid are added and then, while cooling, potassium borohydride is added until the solution turns colorless and alkaline. After addition of water the 18β-acetoxy-17α-methoxy - 16β - carbomethoxy-12-aza-3α,20α-yohimbane (IXa) crystallizes out. The mixture is vacuum filtered, the filter cake is washed with water and with methanol and is dried at 100° C. 280 mgm. (which is 93% of theory) of compound IXa, having a melting point of 340° C. are obtained.

By crystallization from 40 cc. of a mixture of equal parts of methylene chloride and methanol and passage through animal charcoal, a product is obtained which melts at 345° C. and has a specific rotation of $[\alpha]_D^{20} = -110°$ (c.=0.5% in pyridine). This compound, which is not described in the literature, is obtained in the form of colorless prismatic crystals, which are slightly soluble in alcohol, acetone, benzene and chloroform and insoluble in ether and water.

*Analysis.*—$C_{23}H_{29}O_5N_3$; molecular weight=427.49. Calculated: C, 64.62%; H, 6.84%; N, 9.83%. Fund: C, 64.8%; H, 6.9%; N, 9.7%.

This compound can be saponified, lactonized and the lactone isomerized, as is well known in the art, to give the corresponding 3β isomer lactone.

STAGE H.—18β-ACETOXY-17α-METHOXY-16β-CARBO-METHOXY-12-AZA-3β,20α-YOHIMBANE (IXb)

A mixture consisting of 7.5 gm. of compound VIII obtained in stage E, 75 cc. of acetone, 75 cc. of 2 N perchloric acid and 0.75 cc. of a 45° Bé. solution of ferric chloride, is refluxed and 15 gm. of powdered zinc are added thereto. Refluxing with agitation is maintained for 30 minutes. The solution is then decanted, the residue rinsed with acetone and combined with the solution and the combined solutions are poured into water and extracted with methylene chloride. The extract solutions are washed with 1 N hydrochloric acid. The aqueous phases are combined, an excess of ammonia is added and the solution is extracted with methylene chloride, containing 30% methanol. The organic phase is filtered, the filtrate is dried over magnesium sulfate and, after passing it through animal charcoal is distilled to dryness. The solid residue is triturated with 5 cc. of acetone, vacuum filtered, washed with methanol and dried. About 3 gm. (which is 40% of theory) of raw 18β-acetoxy-17α-methoxy - 16β - carbomethoxy-12-aza-3β,20α-yohimbane (IXb) having a melting point of 298° C. are recovered. After recrystallization from a mixture of equal parts of methylene chloride and methanol the analytically pure product is obtained which has a melting point of 302° C. and a specific rotation of $[\alpha]_D^{20} = -115°$ (c.=0.5% in pyridine). It is very slightly soluble in alcohol, acetone, benzene, and chloroform, and insoluble in ether and water.

*Analysis.*—$C_{23}H_{29}O_5N_3$; molecular weight=427.49. Calculated: C, 64.62%; H, 6.84%; N, 9.83%. Found: C, 64.9%; H, 6.8%; N, 9.8%.

This compound is not described in the literature.

STAGE I.—18β-HYDROXY-17α-METHOXY-16β-CARBO-METHOXY-12-AZA-3β,20α-YOHIMBANE (X)

A mixture consisting of 3.34 gm. of compound IXb, obtained according to stage H, 1.35 gm. of potassium borohydride and 135 cc. of methanol is refluxed for 6 hours. Toward the end of the period of heating, the mixture is concentrated to a volume of 20 cc., whereupon crystallization takes place. The mixture is iced and vacuum filtered. The filter cake is washed with water and with methanol and dried at 100° C., yielding 2.32 gm. (which is 77% of theory) of 18β-hydroxy-17α-methoxy - 16β-carbomethoxy-12-aza-3β,20α-yohimbane (X) which has a melting point of 250° C. and then at 280° C. A second yield of 0.43 gm. having a melting point of about 280° C. is obtained by concentration of the mother liquor. This raises the yield of unpurified product to 91% of theory. This unpurified product may be used for the esterification in the last stage. For analysis, the unpurified product is crystallized from a 50% aqueous solution of dimethylformamide and then from a 50% methanolic solution of methylene chloride. The purified product X has a melting point of 295° C. and a specific rotation of $[\alpha]_D^{20} = -100°$ (c.=0.5% in pyridine).

This compound, which is new, is obtained in the form of fine colorless needles which are very slightly soluble in alcohol, acetone, benzene and chloroform, and insoluble in ether and water.

*Analysis.*—$C_{21}H_{27}O_4N_3$; molecular weight=385.45. Calculated: C, 65.43%; H, 7.06%; N, 10.90%. Found: C, 65.6%; H, 7.4%; N, 10.9%.

STAGE J.—18β-(3′,4′,5′-TRIMETHOXY-BENZOYLOXY)-17α-METHOXY-16β-CARBOMETHOXY - 12 - AZA-3β,20α-YOHIMBANE (XI)

A mixture of 2.15 gm. of compound X, obtained according to the preceding stage, 4.84 gm. of 3,4,5-trimethoxy-benzoyl chloride and 22 cc. of pyridine is heated in a closed vessel at 77° C. for 16 hours. Thereafter, 9 cc. of water are added, the mixture is allowed to stand for 20 minutes at 40° C., and then concentrated ammonia is introduced in excess. After again adding water, 18β-(3′,4′,5′ - trimethoxy - benzoyloxy) - 17α - methoxy - 16β-carbomethoxy-12-aza-3β,20α-yohimbane (XI) crystallizes out. The mixture is vacuum filtered and the filter cake is washed with water and with methanol and is dried at 100° C. The yield is 2.1 gm. (which is 65% of theory) of compound XI, having a melting point of 288° C. By recrystallization from methanolic methylene chloride (3:1), followed by dissolution in methylene chloride and filtration through neutral alumina and charcoal, concentration, taking up in methanol, vacuum filtration and drying of the filter cake, a product is obtained in the form of colorless crystals which are soluble in chloroform, slightly soluble in acetone and alcohol and insoluble in ether and water. The crystals of compound XI have a melting point of 290° C. and a specific rotation of $[\alpha]_D^{20} = -157°$ (c.=0.5% in chloroform).

*Analysis.* — $C_{31}H_{37}O_8N_3$; molecular weight=579.63. Calculated: C, 64.23%; H, 6.43%; N, 7.25%. Found: C, 64.2%; H, 6.4%; N, 7.2%.

This product is new.

The preceding specific embodiment of the invention is in no way to be construed as limiting. Such modifications and changes as would be apparent to one skilled in the art can be made without departing from the spirit of the invention or the scope of the appended claims.

We claim:

1. Levorotatory in chloroform 18β-(3′,4′,5′-trimethoxy-benzoyloxy)-17α-methoxy - 16β - carbomethoxy-12-aza-3β,20α-yohimbane having the formula

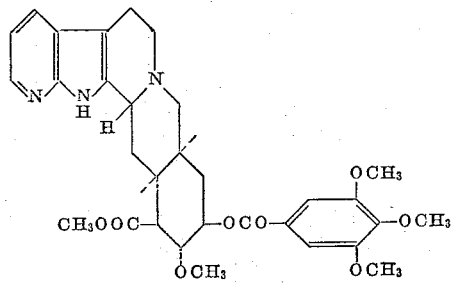

2. 18β-acetoxy-17α-methoxy-16β-carbomethoxy-2-3,3-4-diseco-12-aza-$\Delta^{4(21)}$-20α-yohimbene-3-oic acid.

3. 18β-acetoxy-17α-methoxy-16β-carbomethoxy-2-3,3-4-diseco-12-aza-20α-yohimbane-3-oic acid.

4. 18β-acetoxy - 17α - methoxy-16β - carbomethoxy-3-oxo-2-3-seco-12-aza-20α-yohimbane.

5. 18β-acetoxy - 17α - methoxy-16β-carbomethoxy-12-aza-$\Delta^{3(14)}$-20α-yohimbene.

6. 18β-acetoxy - 17α - methoxy-16β-carbomethoxy-12-aza-3β,20α-yohimbane.

7. 18β-acetoxy - 17α - methoxy-16β - carbomethoxy-12-aza-3α,20α-yohimbane.

8. 18β-hydroxy - 17α - methoxy-16β-carbomethoxy-12-aza-3β,20α-yohimbane.

9. The process for the preparation of levorotatory in chloroform 18β-(3′,4′,5′-trimethoxy-benzoyloxy)-17α-methoxy-16β-carbomethoxy - 12 - aza-3β,20α-yohimbane which comprises the steps of condensing 7-aza-tryptamine with dextrorotatory in pyridine 1β-carboxymethyl-2β-carbomethoxy - 3α - methoxy - 4β - acetoxy - 6β - formyl cyclohexane in the presence of a tertiary amine and an aqueous organic solvent at temperatures between about +10° C. and −10° C., reducing the condensation product, 18β-acetoxy-17α-methoxy-16β-carbomethoxy-2-3,3-4-diseco-12-aza-Δ$^{4(21)}$-20α-yohimbene-3-oic acid, into 18β-acetoxy - 17α - methoxy - 16β - carbomethoxy-2-3,3-4-diseco-12-aza-20α-yohimbane-3-oic acid in an inert organic solvent with an alkali metal borohydride at temperatures between about 0° C. and −10° C., acidifying to a pH of 5–6, and heating the 18β-acetoxy-17α-methoxy-16β-carbomethoxy-2-3,3-4-diseco-12-aza-20α - yohimbane-3-oic acid in an inert organic solvent to temperatures above 75° C., reacting the 18β-acetoxy-17α-methoxy-16β-carbomethoxy-3-oxo-2-3-seco-12-aza-20α-yohimbane with phosphorus oxychloride at reflux temperatures, neutralizing with ammonia and recovering 18β-acetoxy-17α-methoxy-16β - carbomethoxy-12-aza-Δ$^{3(14)}$-20α-yohimbene, reducing said Δ$^{3(14)}$-yohimbene by the action of zinc in an acid medium to give a mixture of 3α- and 3β-isomers of 18β-acetoxy-17α-methoxy-16β - carbomethoxy-12-aza-20α-yohimbane, separating the 3β-isomer from its 3α-isomer by making use of the difference of solubility, partially saponifying said 3β-isomer by action of an alkali metal borohydride in an inert organic solvent to give 18β-hydroxy-17α - methoxy - 16β - carbomethoxy-12-aza-3β,20α-yohimbane, esterifying the latter compound with a derivative of 3,4,5-trimethoxy-benzoic acid selected from the group consisting of the acid chloride and acid anhydride in the presence of an amine, and recovering said levorotatory in chloroform 18β-(3′,4′,5′-trimethoxybenzoyloxy)-17α - methoxy - 16β - carbomethoxy-12-aza-3β,20α-yohimbane.

10. The process of claim 9 wherein the condensation of the 7-aza-tryptamine with the dextrorotatory in pyridine 1β-carboxymethyl-2β-carbomethoxy-3α-methoxy-4β-acetoxy-6β-formyl-cyclohexane is effected in the presence of triethylamine in aqueous dimethylformamide.

11. The process of claim 9 wherein the 18β-acetoxy-17α-methoxy - 16β - carbomethoxy-2-3,3-4-diseco-12-aza-Δ$^{4(21)}$-20α-yohimbene-3-oic acid is reduced by means of potassium borohydride at about −10° C.

12. The process of claim 9 wherein the 18β-acetoxy-17α-methoxy - 16β - carbomethoxy - 12 - aza-Δ$^{3(14)}$-20α-yohimbene is reduced by the action of zinc in a perchloric acid medium.

13. The process of claim 9 wherein the esterification of 18β-hydroxy-17α-methoxy-16β - carbomethoxy-12-aza-3β,20α-yohimbane is effected with the anhydride of 3,4,5-trimethoxy-benzoic acid in the presence of pyridine and of triethylamine.

14. The process of claim 9 wherein the esterification of 18β-hydroxy-17α-methoxy-16β - carbomethoxy-12-aza-3β,20α-yohimbane is effected with 3,4,5-trimethoxy-benzoyl chloride in pyridine solution.

References Cited in the file of this patent

UNITED STATES PATENTS 2,883,384     Woodward _____ Apr. 21, 1959

OTHER REFERENCES

Robison et al.: Jour. Amer. Chem. Soc., vol. 78 (1956), pages 1247–51.

UNITED STATES PATENT OFFICE
CERTIFICATION OF CORRECTION

Patent No. 3,018,286                  January 23, 1962

Leon Velluz et al.

It is hereby certified that error appears in the above numbered patent requiring correction and that the said Letters Patent should read as corrected below.

Column 3, lines 33 to 44, formula XI should appear as shown below instead of as in the patent:

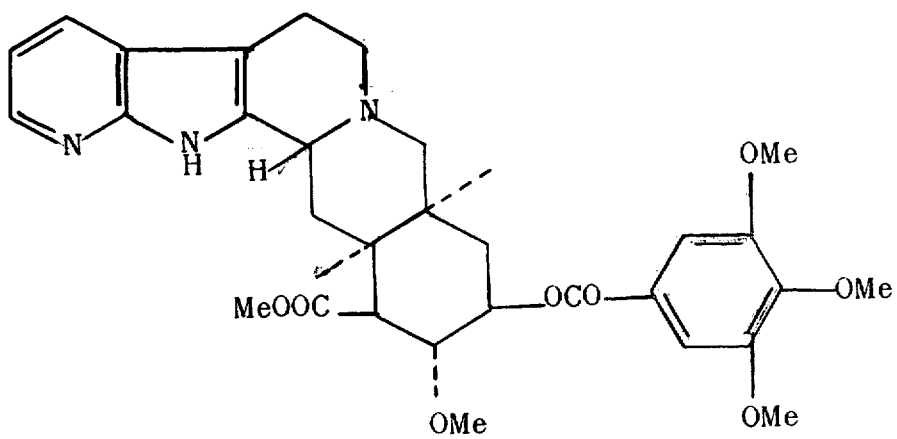

column 5, line 61, for "METHOXY-2 3," read -- METHOXY-2-3, --; column 6, line 5, for "METHOXY-2-3 3-4-" read -- METHOXY-2-3, 3-4- --; line 49, for "VII" read -- VIII --; column 7, line 9, for "Fund" read -- Found --.

Signed and sealed this 10th day of July 1962.

(SEAL)
Attest:

ERNEST W. SWIDER                  DAVID L. LADD
Attesting Officer                  Commissioner of Patents